United States Patent [19]

Schreyer et al.

[11] 4,058,291
[45] Nov. 15, 1977

[54] LOAD BINDER

[75] Inventors: Kenneth D. Schreyer, Clarence; Soma M. Rohosy, Hartland; Charles J. Manney, Kenmore, all of N.Y.

[73] Assignee: Columbus McKinnon Corporation, Tonawanda, N.Y.

[21] Appl. No.: 740,423

[22] Filed: Nov. 10, 1976

[51] Int. Cl. ............................................. B66f 1/06
[52] U.S. Cl. ...................................... 254/74; 254/78
[58] Field of Search ........................... 254/74, 78, 75; 24/68 CD, 68 CT

[56] References Cited

U.S. PATENT DOCUMENTS

| 139,969 | 6/1873 | Paff | 254/78 |
|---|---|---|---|
| 433,799 | 8/1890 | Mason | 254/74 |
| 1,140,757 | 5/1915 | Meyer | 254/78 |
| 1,537,070 | 5/1925 | Dixon | 254/74 |
| 1,845,758 | 2/1932 | McDuff | 254/75 |
| 2,227,893 | 1/1941 | Benjamin | 254/75 |
| 2,340,409 | 2/1944 | Benjamin | 254/74 |
| 2,704,200 | 3/1955 | Call | 254/78 |
| 3,261,588 | 7/1966 | Jensen et al. | 254/74 |

FOREIGN PATENT DOCUMENTS

| 499,466 | 1/1954 | Canada | 254/78 |
|---|---|---|---|
| 110,511 | 3/1944 | Sweden | 254/74 |

*Primary Examiner*—Robert C. Watson
*Attorney, Agent, or Firm*—Bean, Kauffman & Bean

[57] ABSTRACT

A manually operable tool for engaging a welded wire link type chain for tensioning the chain against a load. The tool comprises a main body portion which is tunneled to accommodate insertion and progress of the chain therethrough; the body portion having an access opening through the tunnel wall to permit insertion of an operating lever. The lever is arranged to pivotally rock relative to the body portion so as to alternately engage/disengage with the chain for driving the chain through the tunnel. Means are provided for holding the chain against retrogressive movements relative to the body, intermediately of levering operations.

8 Claims, 22 Drawing Figures

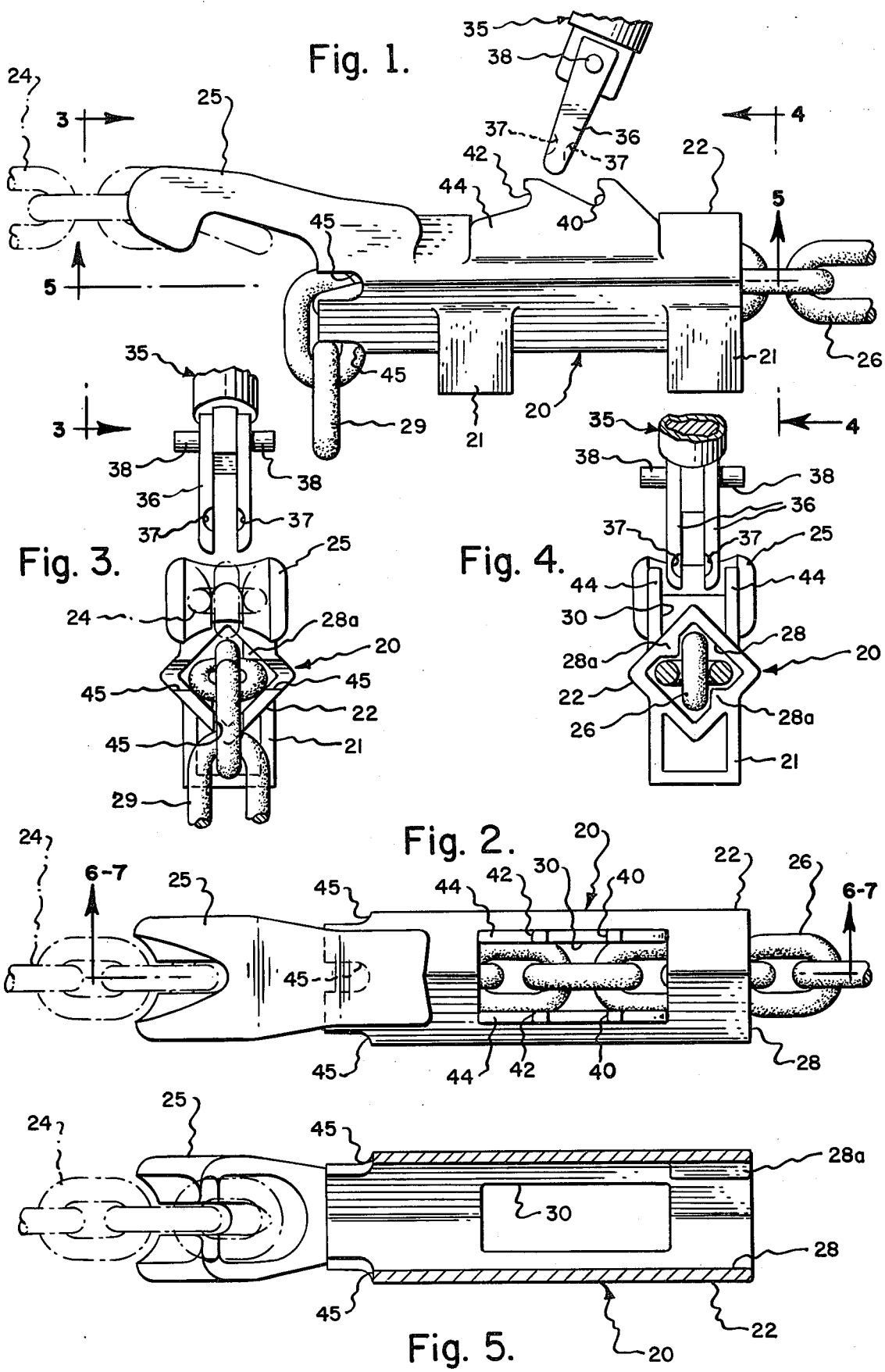

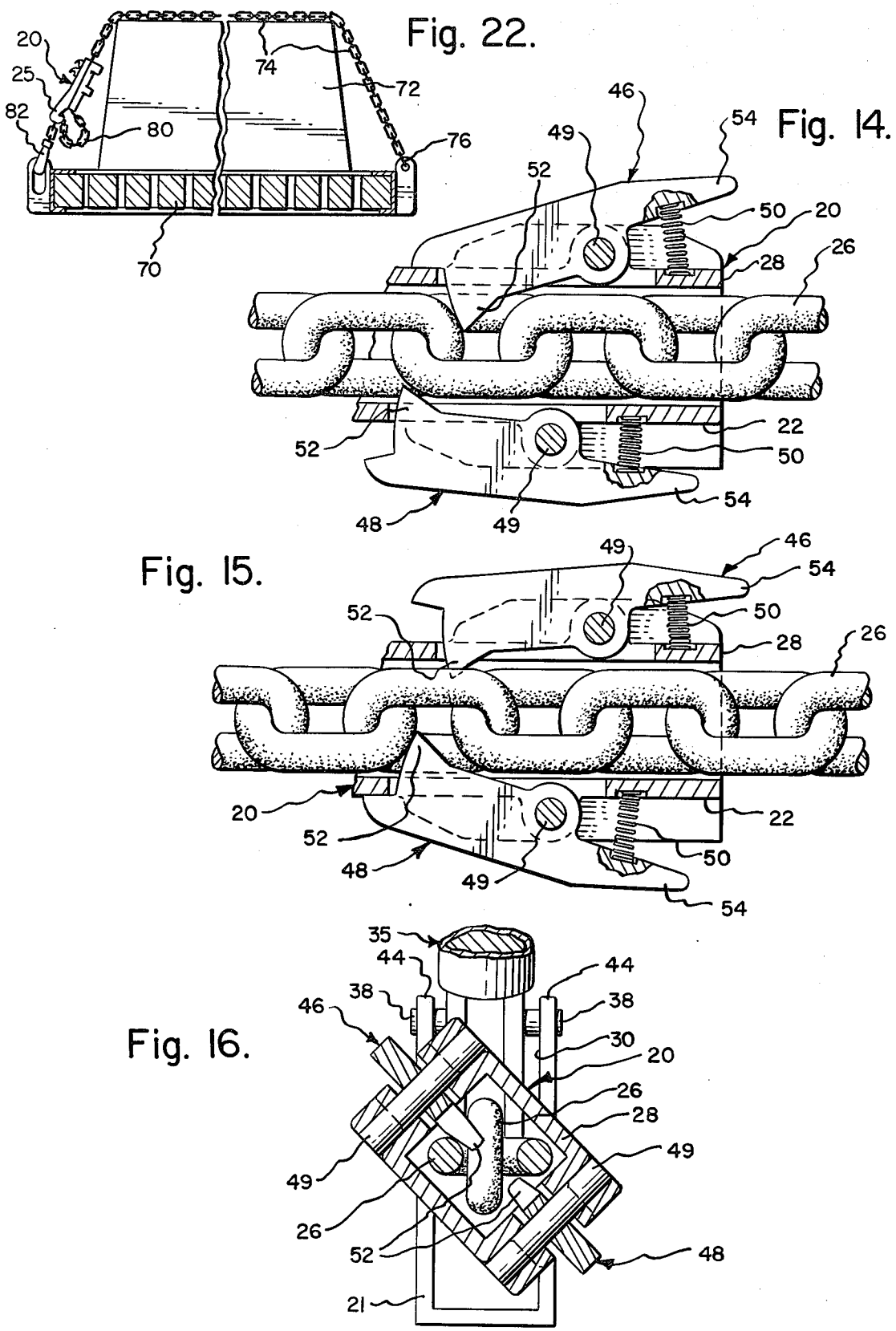

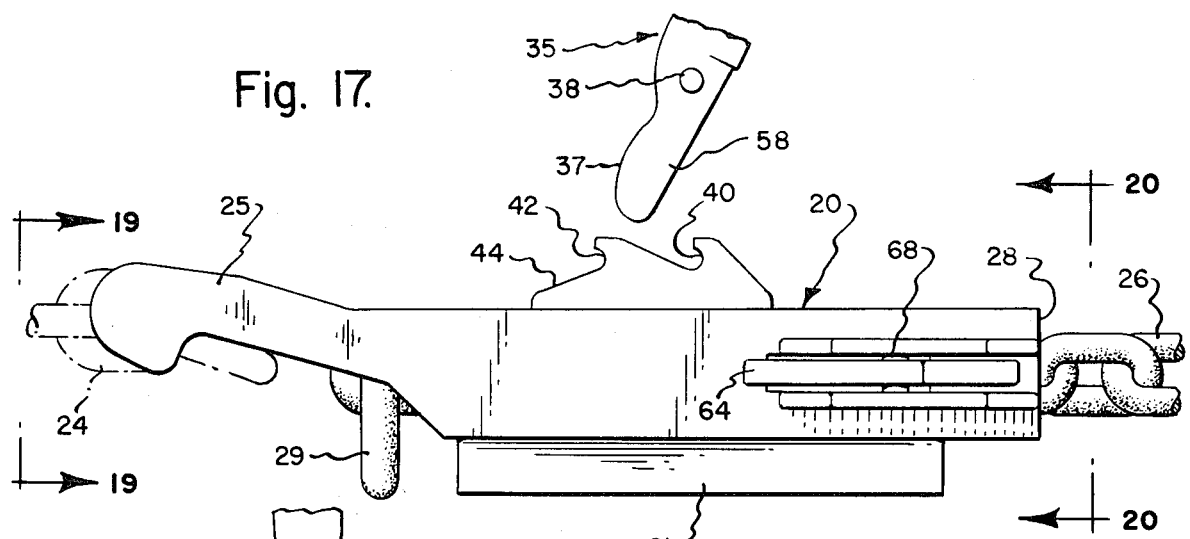
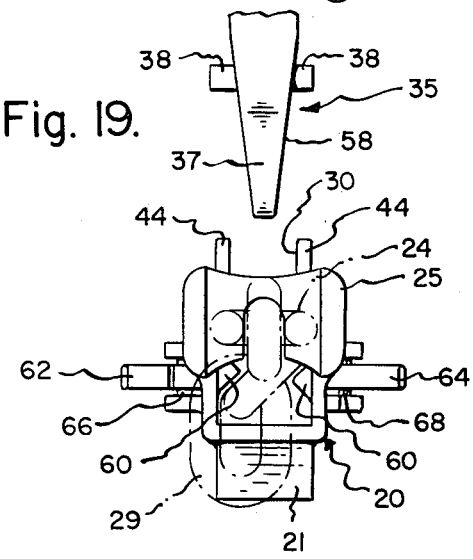
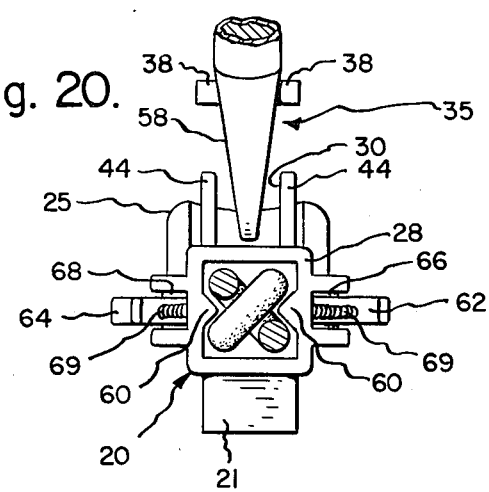
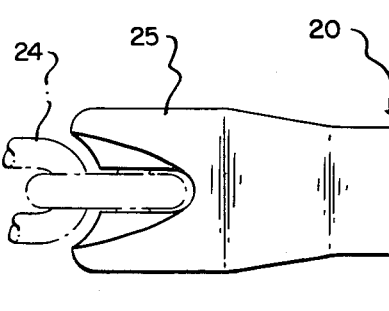
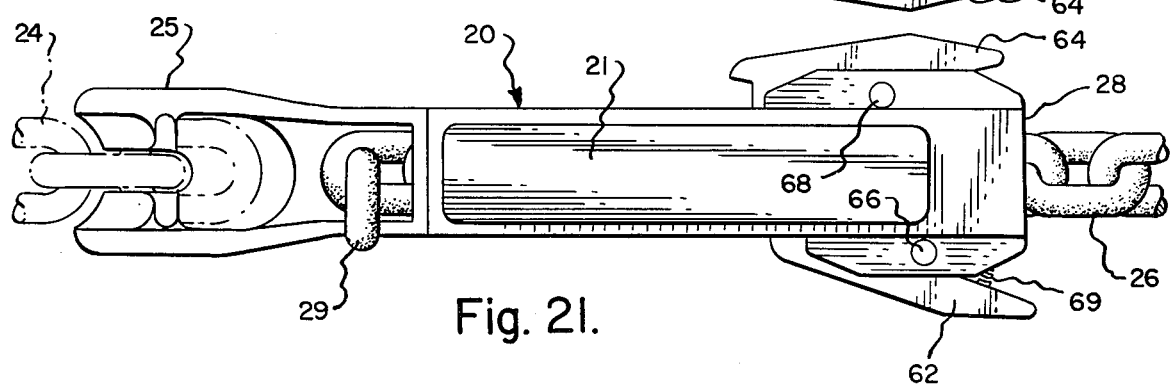

LOAD BINDER

BACKGROUND AND OBJECTS OF THE INVENTION

This invention relates to improved load binding tools; i.e. devices for "binding" chains about loadings on a truck body or the like; such as boxes, crates, logs, pipes, rods, or the like, and/or single load items upon load carriers or lifters. Such tools are used to reduce the effective length of the binding chain, and to tighten/tension it around the load, and then lock it against accidental release. Prior types of load binders are disclosed for example in U.S. Pat. Nos. 433,799; 858,240; 1,537,070; Canadian Pat. No. 499,466 and Swedish Pat. No. 110,511.

An object of the invention is to provide improved chain binders as aforesaid which are compact, readily portable, convenient to use; and yet when in use assure positive but readily releasable locking engagements of the associated chain.

A further object is to provide a chain tightener as aforesaid which comprises a manually operable tool embodying a tunnel portion extending therethrough in communication with a chain inlet guide throat portion which is adapted to angularly orient a welded wire type link chain when fed thereinto; allowing the operator to easily introduce an end of the binding chain into and through the body of the tool in properly oriented fashion for engagement with the operating lever of the tool.

A further object is to provide in combination therewith an improved operating lever which is manually engageable into pivotal connection with the body member and which is shaped and pocketed at its chain engaging end, so as to be operable to provide an improved technique for chain advancements through the tool.

A further object is to provide an improved operating lever as aforesaid which includes pivot boss portions extending laterally from opposite sides thereof, and a tool body as aforesaid which includes a pair of upstanding pivot socket portions straddling an access opening for the chain engaging end of the lever into the aforesaid tunnel portion; whereby the lever may be inserted into chain engaging position as said boss portions are engaged in pivotable relation in said socket portions.

A further object is to provide a tool as aforesaid wherein multiples of the aforesaid paired pivot socket portions are provided in spaced relation longitudinally of the tool body, whereby the lever is operable in a variety of modes.

A further object is to provide in a tool as aforesaid novel chain holding arrangements for preventing unintended retrogressive movements of the chain through the tool body.

THE DRAWING

Various forms of the load binder of the invention are illustrated by way of example by the accompanying drawing, wherein:

FIG. 1 is a side elevational view of a load binder of the invention;

FIG. 2 is a top plan view thereof;

Figure 6:
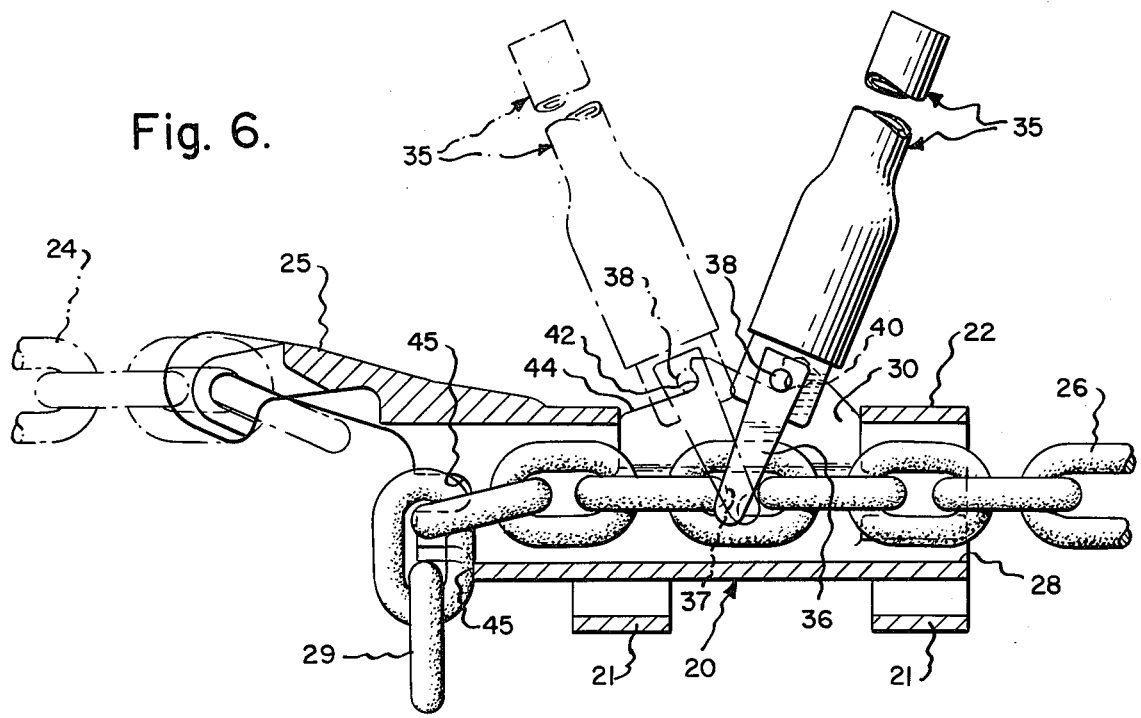
Figure 7:
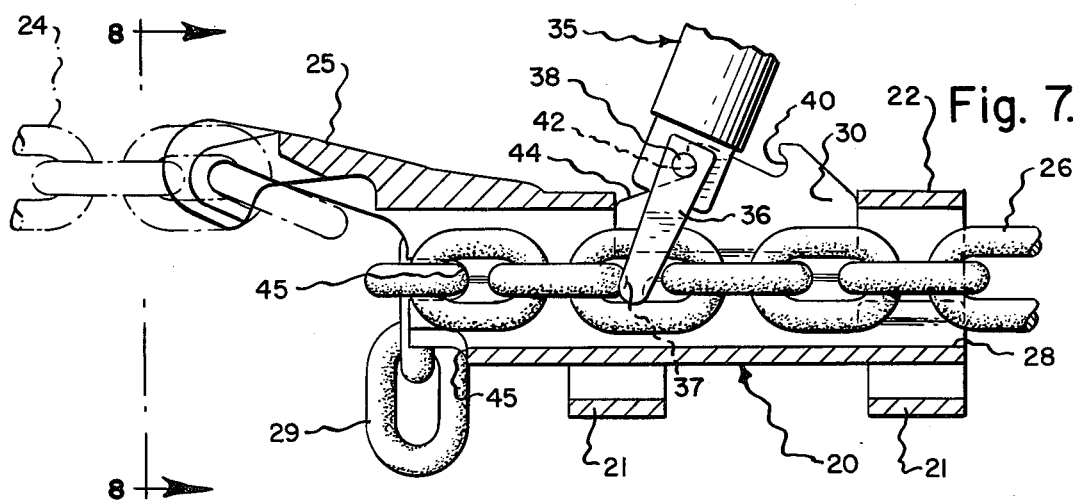
Figure 8:
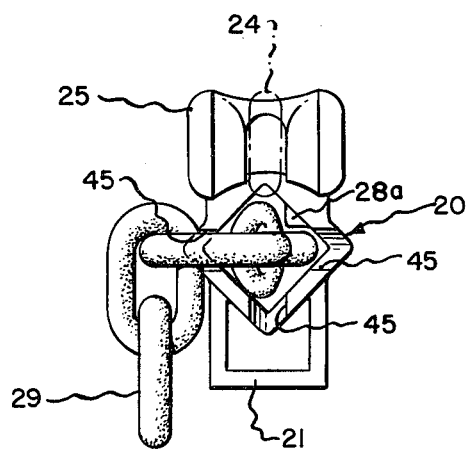
Figure 9:
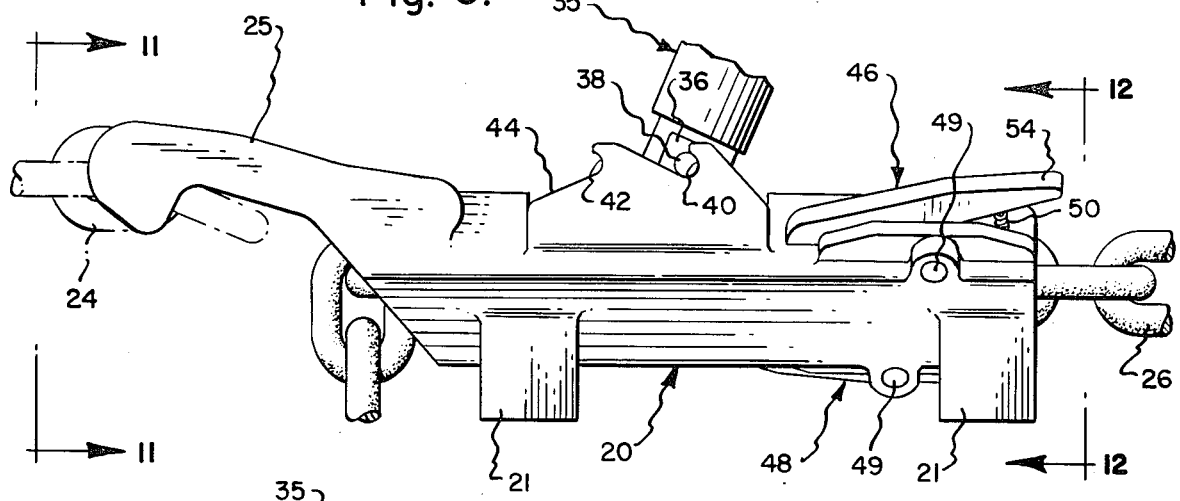
Figure 11:
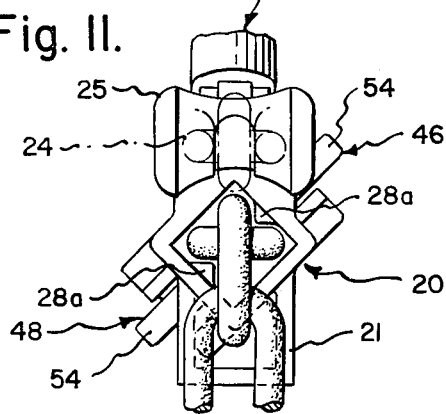
Figure 12:
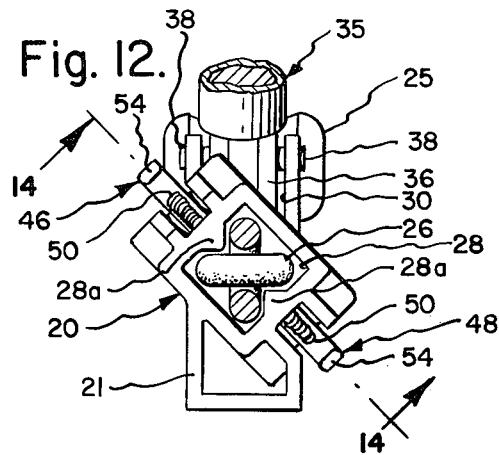
Figure 10:
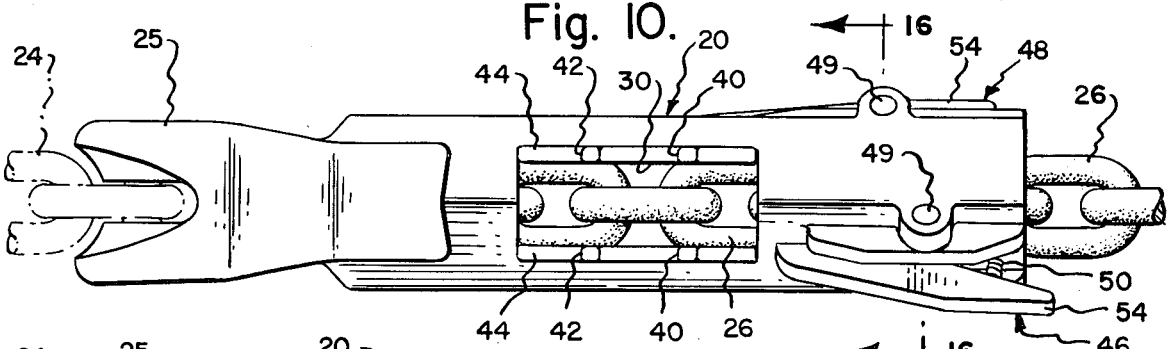
Figure 13:
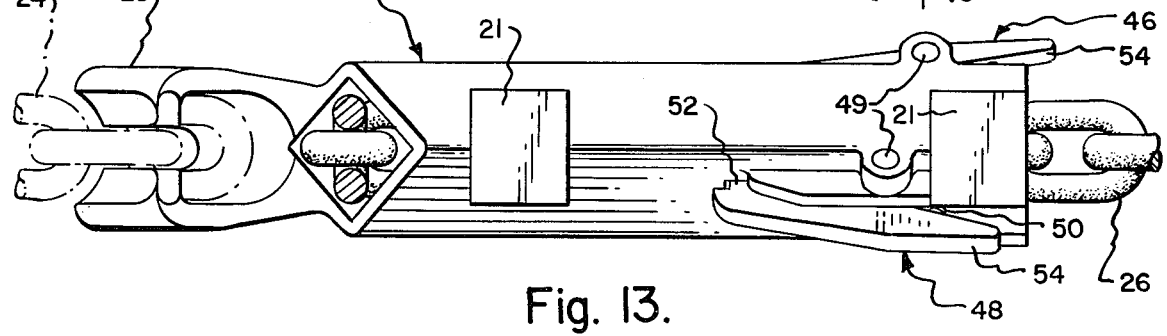

FIGS. 3 and 4 are sectional views taken as suggested by lines 3—3 and 4—4, respectively of FIG. 1;

FIG. 5 is a fragmentary sectional view of the tool of FIGS. 1-4, taken as suggested by line 5—5 of FIG. 1;

FIGS. 6, 7, are sectional views taken as suggested by lines 6—6 and 7—7 of FIG. 2, illustrating alternative modes of operation available to the user of the tool;

FIG. 8 is a rear end elevational view of the tool taken as suggested by line 8—8 of FIG. 7;

FIG. 9 is a view corresponding to FIG. 1 of another form of the invention;

FIG. 10 is a top plan view of the tool of FIG. 9;

FIGS. 11, 12, are end elevational views taken as suggested by lines 11—11 and 12—12, of FIG. 9;

FIG. 13 is a bottom plan view of the tool of FIGS. 9-12;

FIG. 14 is an enlarged scale fragmentary sectional view taken as suggested by line 14—14 of FIG. 12, showing the pawl mechanism in one mode of operation;

FIG. 15 corresponds to FIG. 14, but shows the pawl mechanism in a different mode of operation;

FIG. 16 is an enlarged scale fragmentary section, taken as suggested by line 16—16 of FIG. 10;

FIG. 17 corresponds to FIGS. 1 and 9, but illustrates another modification of the invention;

FIG. 18 is a top plan view of the tool of FIG. 17;

FIGS. 19 and 20 are end elevational views of the took taken as indicated by lines 19—19 and 20—20, respectively;

FIG. 21 is a bottom plan view of the tool of FIGS. 17-20; and

FIG. 22 is a view corresponding to FIGS. 1 and 17, but illustrate how the tool of the invention may be employed in conjunction with a single strand of chain.

DETAILED DESCRIPTION

As illustrated by way of example at FIGS. 1-9 hereof, the tool of the invention may be constructed to comprise a body portion indicated generally at 20 which is of elongate form having box-shaped leg portion 21 upon which the tool may be rested to stabilize it when being operated. The body portion 20 of the tool is formed with an open chain transporting tunnel portion 22 extending longitudinally therethrough. One end of the load binding chain to be tensioned relative to the load thereon is illustrated at 24 as being hooked into a "claw hook" type extension portion 25 of the tool (FIGS. 1, 2, 5, 6, 7). The other end of the load binding chain is illustrated at 26, and in the drawing is shown as having been fed by the tool operator through the inlet throat portion 28 of the tool and into the tunnel 22 to exit therefrom as illustrated at 29. Note that the inlet throat includes guide portions 28a—28a which insure proper angular orientation of the chain in the tunnel 22.

The body portion 20 of the tool is formed with an access opening 30 at the top thereof which is in open communication with the tunnel 22, whereby the operating lever which is indicated generally at 35 may have its lower operative end inserted for engagement with the chain 26. The lever 35 is bifurcated at its lower end so as to provide a pair of fork-like extensions 36—36 which are spaced apart so as to straddle alternate vertically standing links of the chain 26 and to slip-fit downwardly and inside of the horizontally disposed links of the chain as it progresses through the tunnel of the tool. The extensions 36—36 are cupped as indicated at 37 to receive the ends of the chain links. The lever 35 is also provided with pivot boss portions 38—38 extending laterally from opposite sides thereof for pivotally rocking engagements into/with either one of a pair of socket portions 40—40 and 42—42 which are formed in upstanding side wall portions 44-44 extending vertically from the tool body portion in longitudinally parallel relation at opposite sides of the access opening 30.

The tool body and lever portions are so dimensionally proportioned and arranged that the lower end of the lever 35 is readily insertable by the user of the tool through the access opening 30 so as to dispose the fork members 36—36 into engagements with the horizontally lying exposed links of the chain 26, as shown in FIG. 4. The bosses 38—38 thereof are thereupon receivable either by the pockets 40—40 or 42—42. Thus, in any event, the lever is adapted to engage the chain, simply by inserting its forked end into the access opening 30; and to be then operable to "lever" the chain to advance through the tunnel of the tool. As illustrated at FIGS. 1, 3, 5, 6-8, the exit end portion of the chain tunnel 22 is slotted as indicated at 45—45—45 to provide forked holding means at the exit end of the tunnel; whereby whenever the chain strand 26 exits through the tunnel the leading portion 29 thereof may be manually, either vertically or laterally to the right or to the left deflected into one of wall slots 45 so as to lock the exited portion of the chain against unintended retrogressive movement relative to the tool incidental to alternate engagements/disengagements of the lever 35 with the chain 26. Thus, it will be appreciated that in this case the lever 35 is adapted to engage behind every other horizontally disposed link of the chain strand 26, for progressively levering the chain through the tool; while the slots 45 at the exit end of the tool provide for manually intermediately locking of the chain in its incrementally advanced positions.

FIGS. 9-16 of the drawing illustrate a modified form of the tool whereby unintended chain regression movements relative to the tool are prevented by means of a pair of spring-biased pawl devices located at opposite sides of the chain tunnel. The pawl devices are indicated at 46-48 as being pivotally mounted on the body of the tool at 49—49; the pivot axes being inclined 45 degrees relative to the planes of the interconnecting chain links. The springs biasing the pawls are indicated at 50—50. The pawls 46-48 each include a chain link engaging end portion 52, and an operator finger-press portion 54. Note that the pivot points 49—49 of the pawls 46-48 are at different positions longitudinally of the chain tunnel 22, so as to enable the pawls to engage the chain 26 at longitudinally spaced increments therealong. As the chain progresses through the tunnel (in response to operation of the lever 35) the pawls automatically "back up" each increment of chain progression. Accordingly, whereas the pawls function automatically at all times to prevent unintended retrogressive movements of the chain relative to the tool tunnel, they alternate this responsibility (one to the other) according to the status of the chain in the tunnel. Note that because of the angular attitudes of the pawls 46-48 relative to the alternately vertically and horizontally disposed links of the chain, the pawls are adapted to cooperate and engage behind every half link progression of the chain. However, the lever 35 operates to engage behind only every horizontally disposed link.

FIGS. 17-21 of the drawing illustrate a still further modified form of the tool. In this case the lever 35 is formed with a single "blade" like end portion 58 which has a cam shaped edge portion as indicated at 37. The inlet throat portion 28 of the tool is provided with chain guide abutments 60—60 (FIG. 20) and is interiorly shaped so as to maintain the chain strand 26 while passing therethrough oriented so that alternate links of the chain are disposed in opposite vertically inclined attitudes. The chain progression control pawls 62-64 are horizontally pivotmounted on opposite sides of the body 20 as indicated at 66-68, respectively; and are in longitudinally spaced relation. Thus, it will be understood that in the case of the tool of FIGS. 17-21 the pawls project into the tunnel of the tool in angular relation to the chain, and are adapted to intercept unintended retrogressive movements of the chain at every one-half chain pitch increment; while being manually releasable against the pawl springs 69, whenever desired. Also, note that in the case of the tool of FIGS. 17-21, the operating lever 35 is adapted to engage behind every single link of the chain strand 26. Therefore it will be appreciated that the lever 35 is required to operate only through substantially reduced angles of oscillation in order to progress the chain strand 26 through the tool; and that this provides the operator with an improved mechanical advantage relative to the pull upon the load binding chain.

FIG. 22 illustrates another mode of operation of the tool of the invention, wherein the tool is employed in conjunction with a single strand of load binding chain. At FIG. 22 a typical truck bed is illustrated at 70, and a load 72 is shown as being mounted thereon. The single load binding chain is illustrated at 74 and is attached at one of its ends to one side of the truck bed by means of a suitable connection device such as is indicated at 76. The chain is then threaded through the body 20 of the tool, and then looped under the exit end of the tool tunnel as shown at 80. The free end of the chain is then led up into hooked engagement with the claw end portion 25 of the tool, and the remote end of the chain is then hooked onto the opposite side of the truck body as illustrated at 82. Preferably, the first end of the chain is permanently attached to the truck bed as by a welded link or the like, and of course the hook 82 at the other end of the chain will necessarily be too large to pass through the tunnel of the tool. Hence, it will be understood that once the tool is installed on the chain it is not vulnerable to casual theft.

What is claimed is:

1. In a manually operated tool for use in tensioning and locking a welded wire type link chain at least part way about a load, said tool including a tool body portion of elongated form and defining a chain travel accommodating tunnel extending longitudinally thereof; a tool operator actuated lever pivotally supported on said tool body portion and extending into said tunnel for engagement with said chain for advancing said chain between inlet and outlet ends of said tunnel incident to operator actuated chain driving pivotal movements of said lever; guide means mounted on said tool body portion for maintaining said chain within said tunnel in a prescribed angular orientation; and a chain holding means mounted on said tool body portion and arranged to releasably engage said chain for releasably restraining chain retrograde movement through said tunnel in a direction towards said inlet end, the improvement in combination comprising:

said chain holding means including at least two independently operated means successively engageable with alternate links of said chain for restraining chain retrograde movements by an amount essentially equal to one chain pitch increment without effecting change of said prescribed angular orientation of said chain within said tunnel, and said independently operable means being arranged adjacent said outlet end of said tunnel.

2. The improvement according to claim 1, wherein said independently operable means are of forked configuration and defined by slots opening through tunnel defining walls of said tool body portion adjacent said outlet end of said tunnel, said slots being sized to releasably receive links of said chain whereby to position adjacent links of said chain in the direction of advancement of said chain for locking engagement with exterior surfaces of said tunnel defining walls.

3. The improvement according to claim 1, wherein said tunnel is of essentially square cross-sectional configuration, a diagonally measured dimension of said tunnel being sized to loosely receive links of said chain while adjacent ones of said links are arranged in a substantially 90° relationship one to another, said guide means extend inwardly of said tunnel at least adjacent said inlet end for engagement with side surfaces of said links for maintaining said adjacent ones of said link in said 90° relationship, said tool body portion is formed with an access opening elongated in a direction extending between said inlet and outlet ends and opening diagonally of said tunnel, said access opening being lengthwise bounded by a pair of upstanding wall portions cooperating to define lengthwise spaced pairs of socket portions alternatively adapted to removably and pivotally support said lever, and said lever is formed with a bifurcated end removably insertable through said access opening for engagement with said chain and sized to straddle links directionally aligned with said access opening for driving engatement with trailing surfaces of adjacent links leading in the direction of advancement of said chain through said tunnel.

4. The improvement according to claim 3, wherein said independently operable means are of forked configuration and defined by slots opening through tunnel defining walls of said tool body portion adjacent said outlet end of said tunnel, said slots being sized to releasably receive links of said chain whereby to position adjacent links of said chain in the direction of advancement of said chain for locking engagement with exterior surfaces of said tunnel defining walls.

5. In a manually operated tool for use in tensioning and locking a welded wire type link chain at least part way about a load, said tool including a tool body portion of elongated form and defining a chain travel accommodating tunnel extending longitudinally thereof; a tool operator actuated lever pivotally supported on said tool body portion and extending into said tunnel for engagement with said chain for advancing said chain between inlet and outlet ends of said tunnel incident to operator actuated chain driving pivotal movements of said lever; guide means mounted on said tool body portion for maintaining said chain within said tunnel in a prescribed angular orientation; and a chain holding means mounted on said tool body portion and arranged to releasably engage said chain for releasably restraining chain retrograde movement through said tunnel in a direction towards said inlet end, the improvement in combination comprising:

said chain holding means including at least two independently operated means successively engageable with said chain for restraining chain retrograde movements by an amount equal to less than one chain pitch increment, said independently operable means are in the form of pawls spring biased inwardly of said tunnel for chain retrograde movement restraining engagement with trailing surfaces of links of said chain advanced through said tunnel by operation of said lever, and said pawls have chain link engaging portions thereof spaced lengthwise of said tunnel to prevent simultaneous retrograde movement restraining engagement of said portions with said trailing surfaces of said links.

6. The improvement according to claim 5, wherein said guide means maintains adjacent links of said chain at angles of substantially 90° relationship one to another, said portions of said pawls are biased for movement into engagement with trailing surfaces of said links within planes forming substantially 45° angles with said adjacent links, and said pawls are pivotally supported on opposite sides of said tunnel adjacent said inlet end thereof for movement about substantially parallel pivot axis.

7. The improvement according to claim 5, wherein said tunnel is of essentially square cross-sectional configuration, a diagonally measured dimension of said tunnel being sized to loosely receive links of said chain while adjacent ones of said links are arranged in a substantially 90° relationship one to another, said guide means extend inwardly of said tunnel at least adjacent said inlet end for engagement with said surfaces of said links for maintaining said adjacent ones of said link in said 90° relationship, said tool body portion is formed with an access opening elongated in a direction extending between said inlet and outlet ends and opening diagonally of said tunnel, said access opening being lengthwise bounded by a pair of upstanding wall portions cooperating to define lengthwise spaced pairs of socket portions alternatively adapted to removably and pivotally support said lever, said lever is formed with a bifurcated end removably insertable through said access opening for engagement with said chain and sized to straddle links directionally aligned with said access opening for driving engagement with trailing surfaces of adjacent links leading in the direction of advancement of said chain through said tunnel, and said portions of said pawls are biased for movement into engagement with trailing surfaces of said links within planes forming substantially 45° angles with said adjacent links.

8. The improvement according to claim 5, wherein said chain when in said prescribed angular orientation is characterized as having adjacent links disposed in a 90° relationship one to another, said tool body portion is formed with an access opening elongated in a direction extending between said inlet and outlet ends and opening transversely of said tunnel at an angle of approximately 45° relative to said links, said access opening being lengthwise bounded by a pair of upstanding wall portions cooperating to define lengthwise spaced pairs of socket portions alternatively adapted to removably and pivotally support said lever, said lever is formed with a blade-like end portion removably insertable through said access opening for engagement with said chain, said blade-like end portion forming to angle of approximately 45° with said links and being sized for insertion through a given link for driving engagement with a trailing surface of an adjacent link leading in the direction of advancement of said chain through said tunnel, and said portions of said pawls are biased for movement into engagement with trailing surfaces of said links within planes forming substantially 45° angles with said adjacent links.

* * * * *

UNITED STATES PATENT AND TRADEMARK OFFICE
CERTIFICATE OF CORRECTION

PATENT NO. : 4,058,291
DATED : November 15, 1977
INVENTOR(S) : Kenneth D. Schreyer; Soma M. Rohosy; Charles J. Manney It is certified that error appears in the above-identified patent and that said Letters Patent are hereby corrected as shown below:

Column 4, line 3, "pivotmounted" should be ---pivot-mounted---.

Column 6, line 26 (claim 7), "said surfaces" should be ---side surfaces---.

Column 6, line 59 (claim 8), "forming to angle" should be ---forming an angle---.

*Signed and Sealed this*

*Twenty-first* Day of *March 1978*

[SEAL]

*Attest:*

RUTH C. MASON
*Attesting Officer*

LUTRELLE F. PARKER
*Acting Commissioner of Patents and Trademarks*